(12) United States Patent
Chan et al.

(10) Patent No.: US 9,715,324 B2
(45) Date of Patent: Jul. 25, 2017

(54) SINGLE LAYER MULTI-TOUCH SENSING ELECTRODE GROUP OF TOUCH PANEL

(71) Applicant: MStar Semiconductor, Inc., Hsinchu Hsien (TW)

(72) Inventors: Ping-Yu Chan, Hsinchu County (TW); Guo-Kiang Hung, Hsinchu County (TW); I-Cheng Ting, Hsinchu County (TW)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 0 days.

(21) Appl. No.: 15/057,433

(22) Filed: Mar. 1, 2016

(65) Prior Publication Data

US 2016/0274697 A1   Sep. 22, 2016

(30) Foreign Application Priority Data

Mar. 18, 2015   (TW) .............................. 104108604 A

(51) Int. Cl.
G06F 3/044   (2006.01)
(52) U.S. Cl.
CPC .................................... G06F 3/044 (2013.01)
(58) Field of Classification Search
CPC .................... G06F 3/044; G06F 2203/04104
See application file for complete search history.

(56) References Cited

U.S. PATENT DOCUMENTS

| | | | |
|---|---|---|---|
| 9,389,258 B2* | 7/2016 | Kravets | G06F 3/044 |
| 2013/0181942 A1* | 7/2013 | Bulea | G06F 3/044 |
| | | | 345/174 |
| 2015/0049258 A1* | 2/2015 | Qiu | G06F 3/0412 |
| | | | 349/12 |
| 2016/0092019 A1* | 3/2016 | Huang | G06F 3/0416 |
| | | | 345/174 |
| 2016/0170528 A1* | 6/2016 | Wu | G06F 1/22 |
| | | | 345/174 |

* cited by examiner

*Primary Examiner* — Lixi C Simpson
(74) *Attorney, Agent, or Firm* — WPAT, PC

(57) ABSTRACT

A single-layer multi-touch sensing electrode group of a touch panel includes a plurality of first electrodes, and a plurality of second electrodes including a plurality of first sub-electrodes and a plurality of second sub-electrodes that are alternately arranged. Each of the first sub-electrodes includes a first body and a first extension portion. A first accommodating space is formed between the first body and the first extension portion. Each of the second sub-electrodes includes a second body and a plurality of second extension portions. At least one second accommodating space is formed among the second extension portions. Each of first accommodating spaces accommodates one of the second extension portions, and the second accommodating spaces accommodate the first bodies. A plurality of mutual capacitance changes between the first electrodes and the second electrodes are for calculating a position of a touch event.

17 Claims, 10 Drawing Sheets

SINGLE LAYER MULTI-TOUCH SENSING ELECTRODE GROUP OF TOUCH PANEL

This application claims the benefit of Taiwan application Serial No. 104108604, filed Mar. 18, 2015, the subject matter of which is incorporated herein by reference.

BACKGROUND OF THE INVENTION

Field of the Invention

The invention relates in general to a single-layer multi-touch sensing electrode group, and more particularly to a single-layer multi-touch sensing electrode group of a touch panel for enhancing linearity and accuracy of the touch panel.

Description of the Related Art

FIG. 1 shows a conventional single-layer multi-touch sensing electrode group. The sensing electrode group can be divided into two kinds—transmitting electrodes and receiving electrodes. As shown in FIG. 1, the transmitting electrodes include a sensing electrode 105, a sensing electrode 110, a sensing electrode 120 and a sensing electrode 130; the receiving electrodes include a sensing electrode 140, a sensing electrode 150, a sensing electrode 160 and a sensing electrode 170. In general, the transmitting electrodes are equal in size. That is, the sensing electrode 105, the sensing electrode 110, the sensing electrode 120 and the sensing electrode 130 have equal areas. Further, the receiving electrodes are also equal in size. That is, the sensing electrode 140, the sensing electrode 150, the sensing electrode 160 and the sensing electrode 170 have equal areas. The sensing electrode 105, the sensing electrode 110, the sensing electrode 120 and the sensing electrode 130 are directly connected to a control unit (not shown) by connecting lines. The receiving electrodes may further be divided into two types—a first type (an electrode denoted R1 in FIG. 1), including the sensing electrode 140 and the sensing electrode 160 connected by a connecting line 115, and a second type (an electrode denoted R2 in FIG. 1), including the sensing electrode 150 and the sensing electrode 170 connected by a connecting line 125. It should be noted that, the number of electrodes of a touch panel is not limited to the exemplary values in the diagram, and both of the transmitting electrodes and the receiving electrodes may be further extended towards the lower part of the diagram to include more electrodes. The receiving electrodes of the first type are connected to the control unit from the sensing electrode 140 via the connecting lines, and the receiving electrodes of the second type are similarly connected to the control unit from the sensing electrode 150 via the connecting lines.

When the touch panel detects a touch event, the control unit transmits a signal to the transmitting electrodes (the sensing electrode 105, the sensing electrode 110, the sensing electrode 120 and the sensing electrode 130), and the position of the touch event is calculated according to the capacitance changes detected between the receiving electrodes and the transmitting electrodes. For example, when a touch event 180 occurs in a region among the sensing electrode 110, the sensing electrode 140 and the sensing electrode 150 (assuming that the position of the touch event 180 in the y direction is between the sensing electrode 140 and the sensing electrode 150), the sensing electrode 140 and the sensing electrode 150 theoretically sense capacitance changes having equal values. Thus, the control unit may calculate the position of the touch event. However, the proximity of the touch event further includes the connecting line 115 in addition to the sensing electrode 140 and the sensing electrode 150. The connecting line 115 affects the distribution of electric charge and further affects mutual capacitance changes between the sensing electrode 110 and the sensing electrode 140 as well between the sensing electrode 110 and the sensing electrode 150. More specifically, as the connecting line 115 is connected to the sensing electrode 140, the connecting line 115 may be regarded as an extension of the sensing region of the sensing electrode 140. As such, the sensing electrode 140 not only reacts more sensitively to the touch event 180 but also hinders the sensing electrode 150 from sensing the touch event 180 to certain extent. As a result, the touch position of the touch event 180 determined by the control unit is higher than (closer to the sensing electrode 140) the actual position, hence affecting the linearity and accuracy of the touch panel.

SUMMARY OF THE INVENTION

The invention is directed to a pattern of sensing electrode group of a touch panel to improve the linearity and accuracy of the touch panel.

The present invention discloses a single-layer multi-touch sensing electrode group of a touch panel. The single-layer multi-touch sensing electrode group includes a plurality of first electrodes, and a plurality of second electrodes including a plurality of first sub-electrodes and a plurality of second sub-electrodes. The first sub-electrodes and the second sub-electrodes are alternately arranged. The first sub-electrodes are connected to one another, and the second sub-electrodes are connected to one another. Each of the first sub-electrodes includes a body and a first extension portion. A first accommodating space is formed between the first body and the first extension portion. Each of the second sub-electrodes includes a second body and a plurality of second extension portions. At least one second accommodating space is formed between the second extension portions. Each of the first accommodating spaces accommodates one of the second extension portions. The second accommodating spaces accommodate the first bodies. A plurality of mutual capacitance changes between the first electrodes and the second electrodes are for calculating a position of a touch event.

The present invention further discloses a single-layer multi-touch sensing electrode group of a touch panel. The single-layer multi-touch sensing electrode group includes a plurality of first electrodes, and a plurality of second electrodes including a plurality of first sub-electrodes and a plurality of second sub-electrodes. The first sub-electrodes and the second sub-electrodes are alternately arranged. Each of the first sub-electrodes includes a body and a first extension portion. An accommodating space is formed between the first body and the first extension portion. Each of the second sub-electrodes includes a second body ad a plurality of second extension portions. The accommodating spaces accommodate the second extension portions. A plurality of mutual capacitance changes between the first electrodes and the second electrodes are for calculating a position of a touch event.

The present invention further discloses a single-layer multi-touch sensing electrode group of a touch panel. The single-layer multi-touch sensing electrode group includes: a plurality of first electrodes, arranged along a distribution direction; a plurality of second electrodes, arranged parallel to the distribution direction, including a plurality of first sub-electrodes and a plurality of second sub-electrodes, the first sub-electrodes and the second sub-electrodes being alternately arrange, the first sub-electrodes connected to one another, the second sub-electrodes connected to one another; a plurality of first connecting lines, located between the first sub-electrodes and the second sub-electrodes, connecting the first sub-electrodes; a plurality of second connecting lines, connecting the second sub-electrodes; and a plurality of unit electrodes, unapplied by any electric potential, located between the first sub-electrodes and the second sub-electrodes. The area of each of the first sub-electrodes is smaller than the area of each of the second sub-electrodes. A plurality of mutual capacitance changes between the first electrodes and the second electrodes are for calculating a position of a touch event.

In the single-layer multi-touch sensing electrode group of a touch panel of the present invention, by changing the shape of sensing electrode, the sensing electrode is allowed to extend to main sensing regions of adjacent sensing electrodes to expand the sensing range. Compared to a conventional touch panel, the touch panel of the present invention provides better linearity and accuracy.

The above and other aspects of the invention will become better understood with regard to the following detailed description of the preferred but non-limiting embodiments. The following description is made with reference to the accompanying drawings.

DETAILED DESCRIPTION OF THE INVENTION

The disclosure of the present invention includes a sensing electrode group of a touch panel for enhancing the accuracy and linearity of the touch panel. In possible implementation, one skilled person in the art may choose equivalent elements to implement the present invention based on the disclosure of the application. That is, the implementation of the present invention is not limited by the embodiments described in the disclosure.

Figure 2:
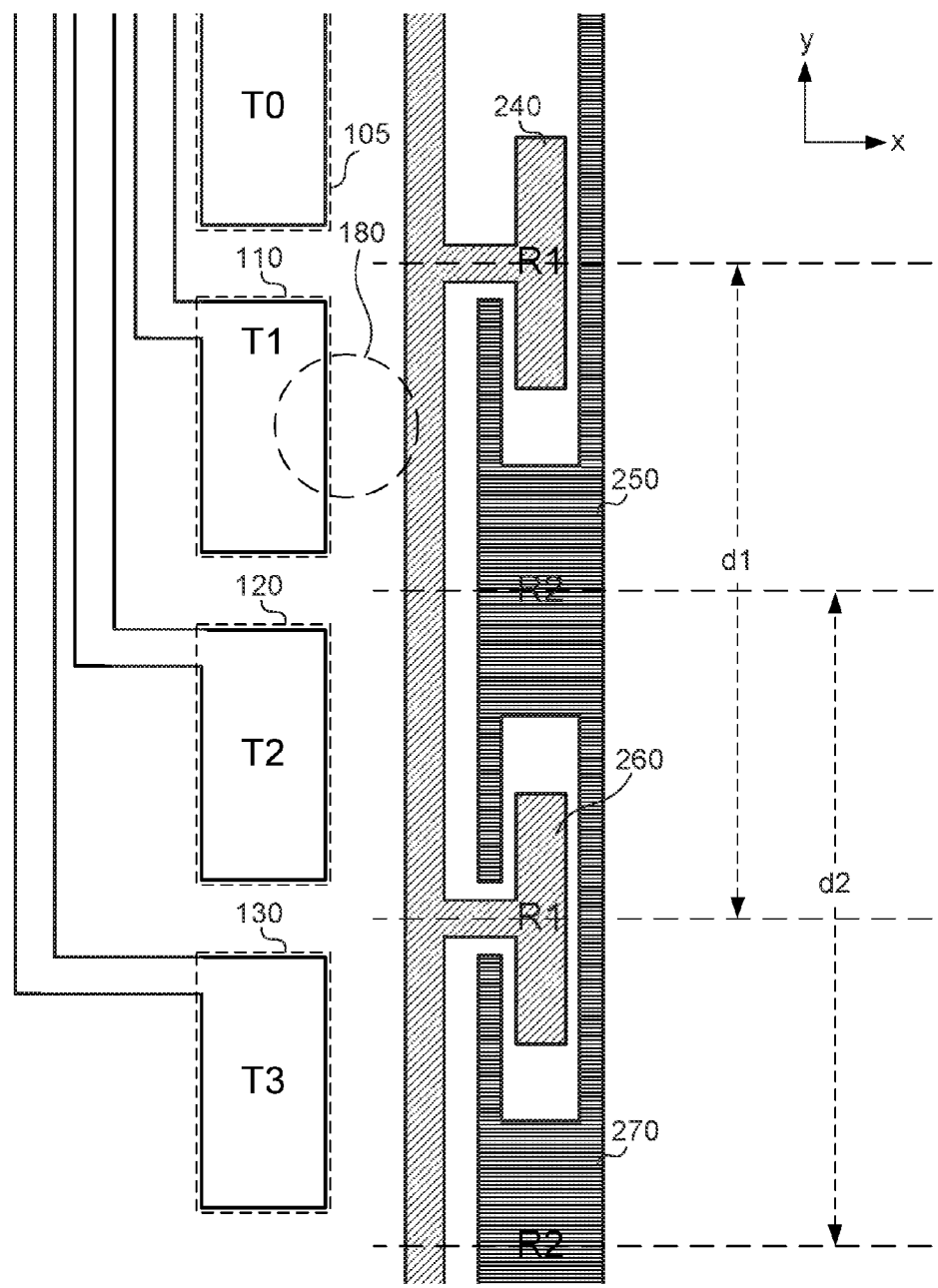
FIG. 2 shows a single-layer multi-touch sensing electrode group of a touch panel according to an embodiment of the present invention.
Figure 3B:
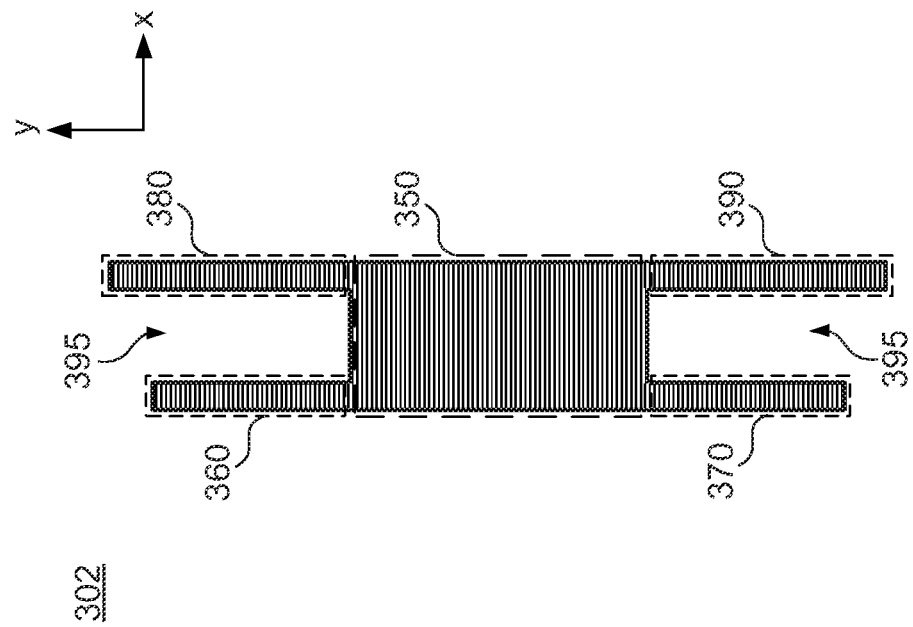
FIG. 3A and FIG. 3B are enlarged views of the sensing electrodes of the embodiment in FIG. 2 of the present invention.
Figure 3A:
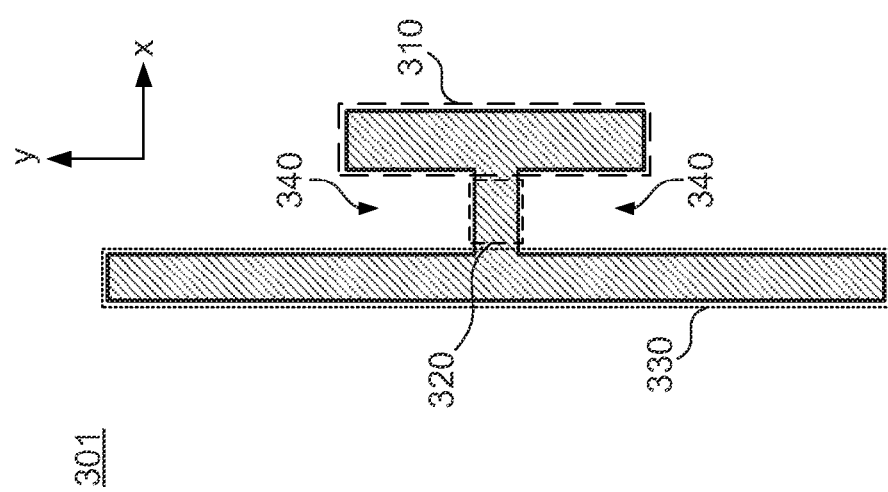

FIG. 2 shows a single-layer multi-touch sensing electrode group of a touch panel according to an embodiment of the present invention. The touch panel includes at least one single-layer multi-touch sensing electrode group, and may further include other electrodes for some purposes, such as electrode at the fringe of the touch panel for fringe calibration. A sensing electrode 105, a sensing electrode 110, a sensing electrode 120 and a sensing electrode 130 are transmitting electrodes, and are rectangular in shape and arranged along the y direction shown in the diagram to become connected via connecting lines or connected directly to a control unit (not shown). A sensing electrode 240, a sensing electrode 250, a sensing electrode 260 and a sensing electrode 270 are receiving electrodes, which are similarly arranged along the y direction and are parallel to the arrangement direction of the transmitting electrodes. The receiving electrodes may be further divided into two types of sensing electrodes, which are respectively denoted as sensing electrodes R1 and sensing electrodes R2. The sensing electrodes R1 and the sensing electrodes R2 are alternately arranged. The sensing electrodes R1 are connected to one another, and are connected to the control unit. Similarly, the sensing electrodes R2 are connected to one another, and are connected to the control unit. FIG. 3A and FIG. 3B show enlarged views of the sensing electrodes of the embodiment in FIG. 2 of the present invention. A sensing electrode 301 in FIG. 3A shows an enlarged view of the sensing electrode R1 in FIG. 2, and includes a body 310, a connecting portion 320 and an extension portion 330. The connecting portion 320 connects the body 310 and the extension portion 330. An accommodating space 340 is formed between the body 310 and the extension portion 330. In the embodiment, the body 310 and the extension portion 330 are both rectangular, and have parallel long sides. The extension portion 330 connects to the extension portion 330 of other adjacent sensing electrodes R1 (except for a particular sensing electrode R1 in FIG. 2, which has its extension portion directly connected to the control unit or connected to the control unit via the connecting line). Thus, given that a distance between centers of two adjacent electrodes R1 in FIG. 2 is d1, the length of the extension portion 330 is also d1. On the other hand, a sensing electrode 302 shown in FIG. 3B is an enlarged view of the sensing electrode R2 in FIG. 2, and includes a body 350, an extension portion 360, an extension portion 370, an extension portion 380 and an extension portion 390. In this embodiment, the body 350 is rectangular, the extension portion 360 and the extension portion 370 are extended outwards along one of the long sides, and the extension portion 380 and the extension portion 390 are extended outwards along the other long side. An accommodating space 395 is formed among the extension portions. The extension portion 380 and the extension portion 390 connect to the extension portion 390 or the extension portion 380 of other adjacent sensing electrodes R2 (except for a particular sensing electrode R2 in FIG. 2, which has its extension portion directly connected to the control unit or connected to the control unit via the connecting line). Thus, given that a distance between centers of two adjacent electrodes R2 in FIG. 2 is d2, a sum of the length of the extension portion 380, the length of the extension portion 390 and the length of the body 350 is also d2. In one preferred embodiment, the sensing electrode 302 is horizontally symmetrical. More specifically, regarding an axis passing through the center of the body 350 and parallel to the short sides as an axis of symmetry, the lengths of the extension portion 380 and the extension portion 390 are equal, which is to say that, the sum of twice the length of length of the extension portion 380 (also the extension portion 390) and the length of the body 350 is d2. In one preferred embodiment, respective gaps between the sensing electrode R1 and the sensing electrode R2 are equal, i.e., d1 is equal to d2.

The accommodating space 340 of the sensing electrode R1 (i.e., the sensing electrode 301) may be used to accommodate the extension portion of the adjacent sensing electrode R2 (i.e., the sensing electrode 302) of the other type. More specifically, the accommodating space 340 is for accommodating the extension portion 360 or the extension portion 370 of the sensing electrode 302. The extension portion 360 or the extension portion 370 accommodated in the accommodating space 340 is close to the connecting portion 320 of the sensing electrode 301, and a closest distance in between is the technological limit of electrode fabrication, e.g., 0.075 mm. However, gaps between other lines are also restrained by technological limits. Further, the line width of the sensing electrodes is also restrained by the technological limit. For example, the width of the extension portion 360 or the connecting line is greater than or equal to 0.125 mm in one preferred embodiment. It is known from FIG. 2 that, the sum of twice the length of the extension portion 360 (also the extension portion 370) and the length of the body 350 is smaller than the distance d2. The difference between the two is equal to the sum of the length of the connecting portion 320 of the sensing electrode 301 and twice the gap in the y direction. Thus, as far as the sensing electrode 302 is concerned, the lengths of the extension portions (the extension portion 380 and the 390) that are not accommodated in the accommodating spaces are greater than the lengths of the extension portions (the extension portion 360 and the extension portion 370) that are accommodated in the accommodating spaces. On the other hand, the accommodating space 395 of the sensing electrode R2 (i.e., the sensing electrode 302) may accommodate the body of the adjacent sensing electrode R1 (i.e., the sensing electrode 301) of the other type, i.e., the body 310 of the sensing electrode 301. In one preferred embodiment, the body 310 of the sensing electrode 301 and the body 350 of the sensing electrode 302 are rectangular, and have equal long sides.

Figure 1:
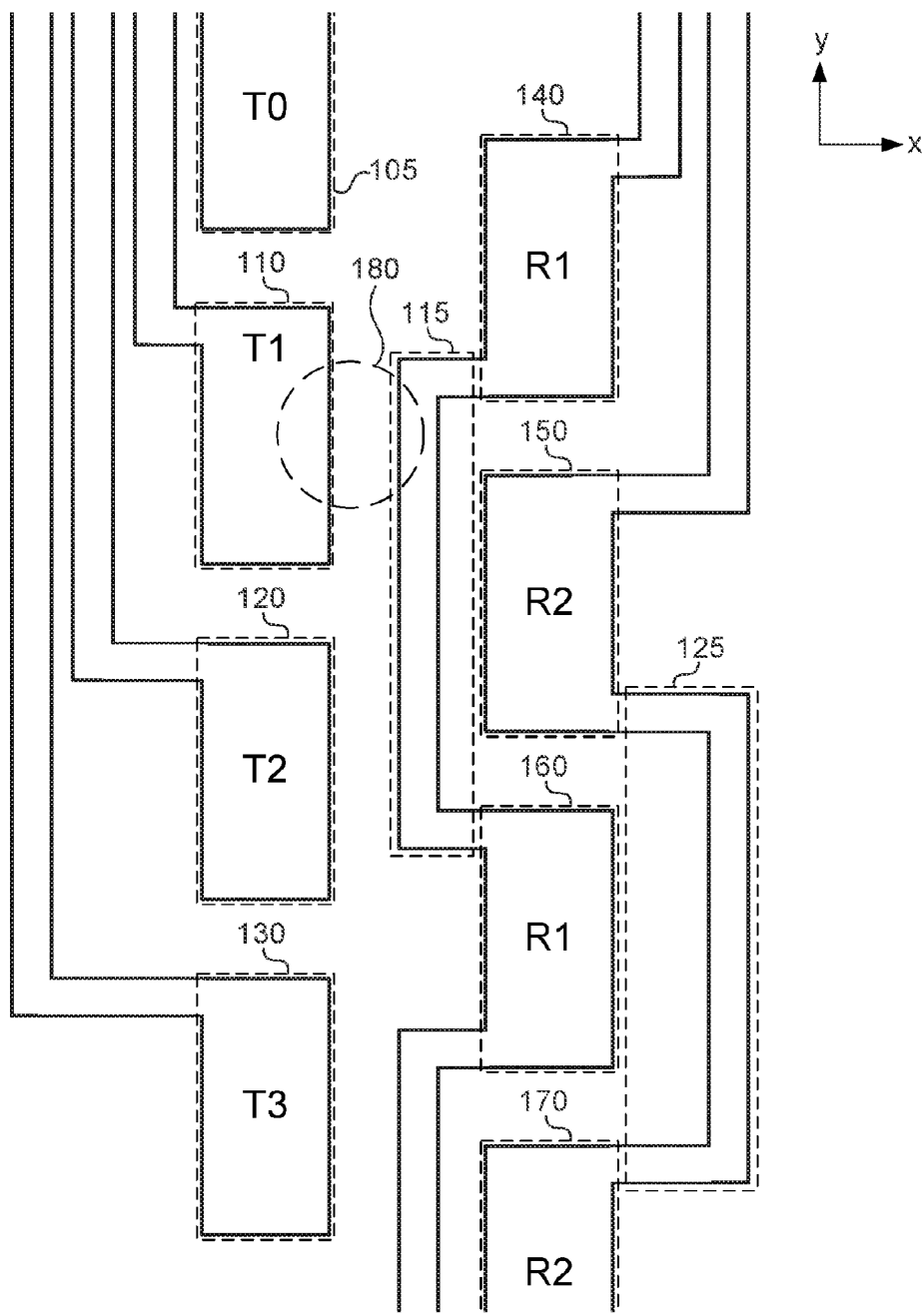
FIG. 1 shows a conventional single-layer multi-touch sensing electrode group of a touch panel.

Referring to FIG. 1 and FIG. 2, it is discovered by comparing the sensing electrodes of the present invention with conventional sensing electrodes that, the area of the body of the sensing electrode R1 is reduced, and the area of the sensing electrode R2 is increased by the additional extension portion. That is to say, the area of the sensing electrode R1 corresponding to any transmitting electrode is reduced, while the area of the corresponding sensing electrode R2 is increased. As one is reduced and the other is increased, for the touch event 180 in FIG. 2, compared to the conventional sensing electrodes in FIG. 1, the capacitance change detected by the sensing electrode R1 becomes smaller, whereas the capacitance change detected by the sensing electrode R2 becomes larger, thereby significantly improving the unsatisfactory accuracy of conventional sensing electrodes of a touch panel.

Figure 4:
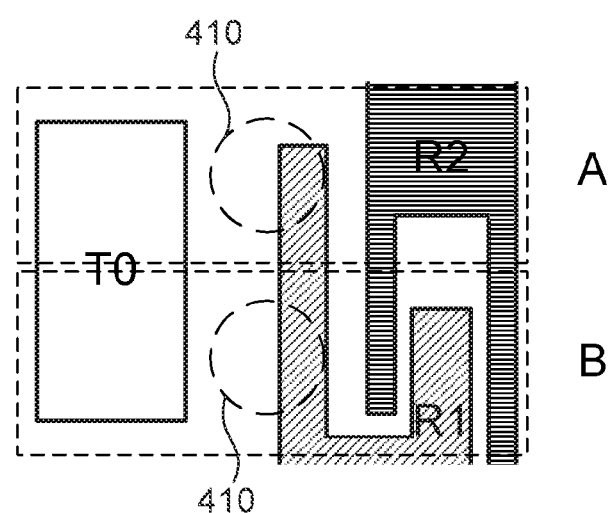
FIG. 4 is a partial enlarged view of the sensing electrode group of the embodiment in FIG. 2 of the present invention.

FIG. 4 shows a partial enlarged view of the sensing electrode group in FIG. 2. In FIG. 4, a sensing electrode T0, a sensing electrode R1 and a sensing electrode R2 are depicted. When a touch event 410 occurs in a region A, a larger touch sensing value exists between the sensing electrode T0 and the sensing electrode R2, whereas a smaller touch sensing value exists between the sensing electrode T0 and the sensing electrode R1. The two touch sensing values are 13.266 pf/meter and 4.475 pf/meter, respectively. On the other hand, when the touch event 410 occurs in a region B, a larger touch sensing value exists between the sensing electrode T0 and the sensing electrode R1, whereas a smaller touch sensing value exists between the sensing electrode T0 and the sensing electrode R2. The two touch sensing values are 13.228 pm/meter and 3.97 pf/meter, respectively. It is discovered that, the touch sensing value between the sensing electrode T0 and the sensing electrode R2 in the region A is close to the touch sensing value between the sensing electrode T0 and the sensing electrode R1 in the region B. That is to say, by adjusting the sensing electrodes, the present invention helps to balance the touch sensing values of the sensing electrode R1 and sensing electrode R2, hence enhancing the accuracy of the touch panel.

Figure 5:
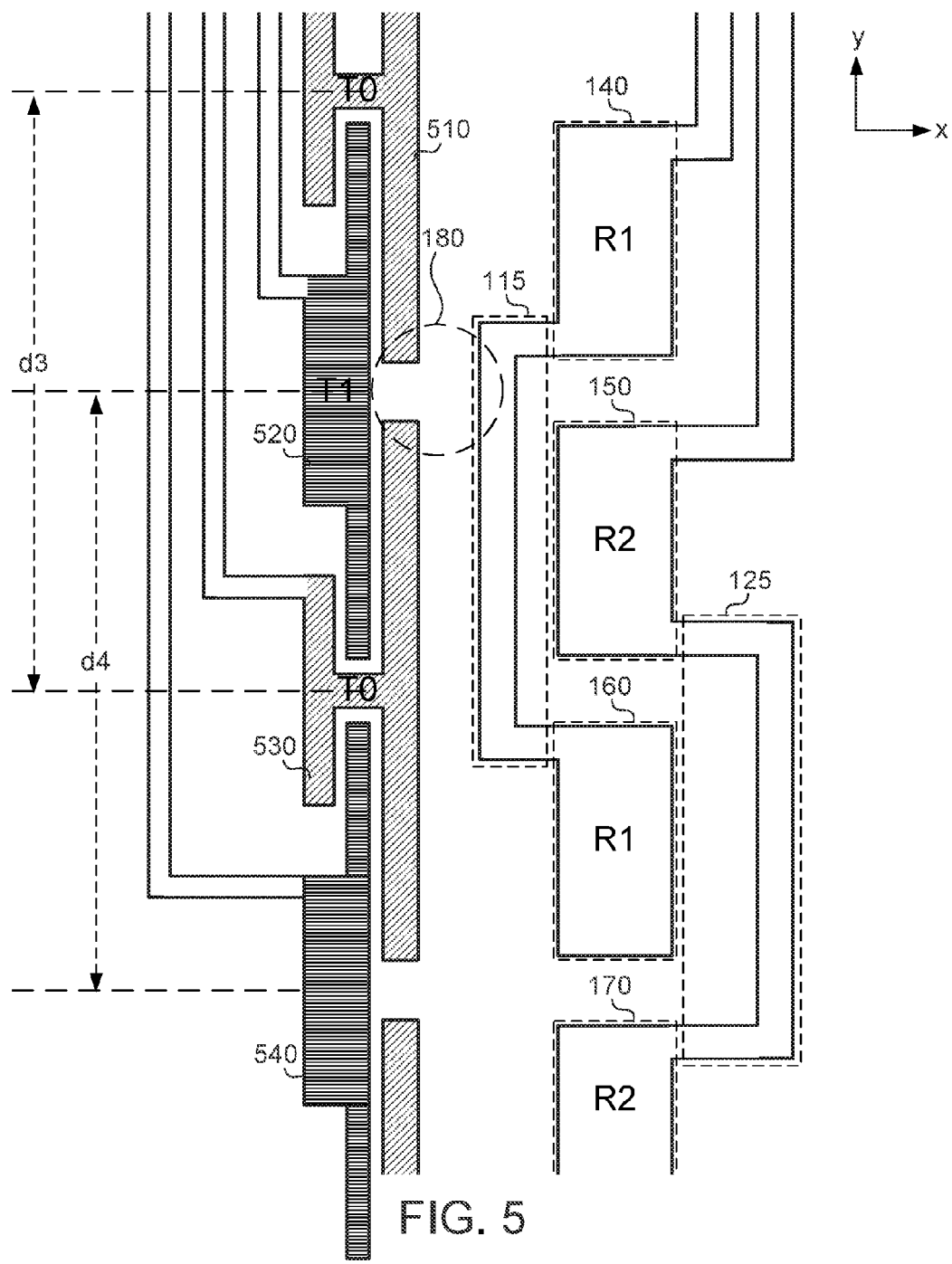
FIG. 5 shows a single-layer multi-touch sensing electrode group of a touch panel according to another embodiment of the present invention.
Figure 6B:
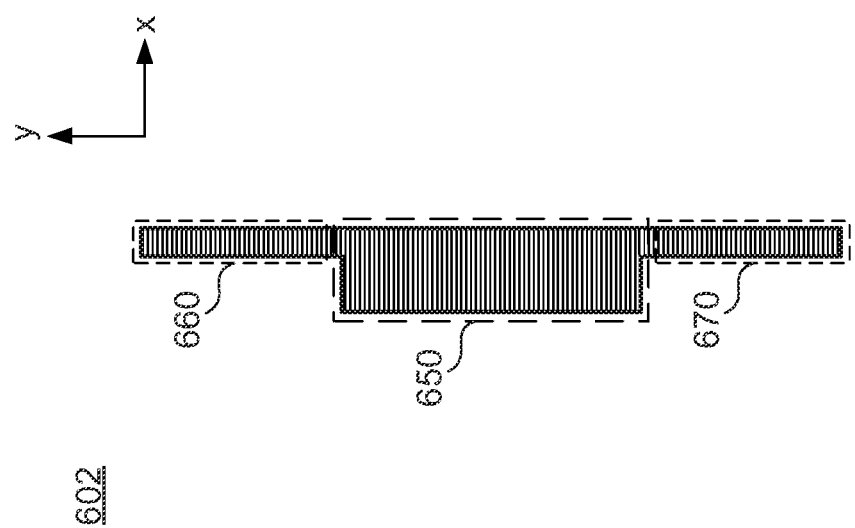
FIG. 6A and FIG. 6B are enlarged views of the sensing electrodes of the embodiment in FIG. 5 of the present invention.
Figure 6A:
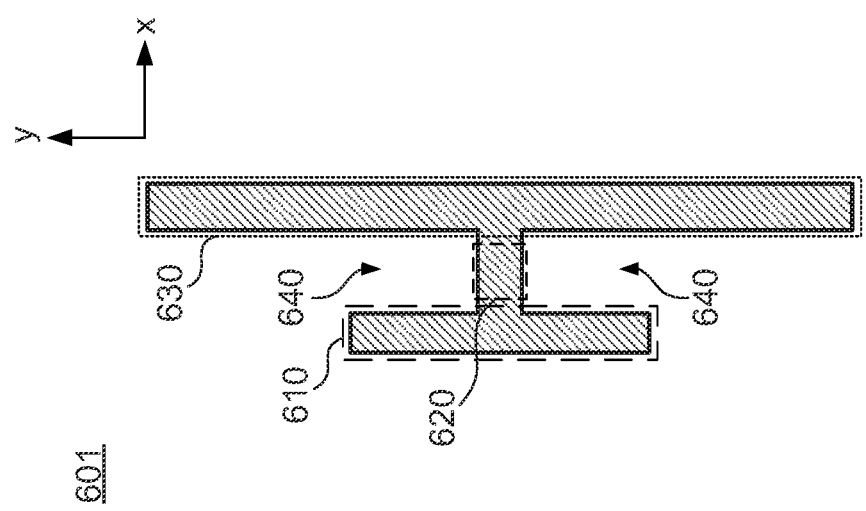

FIG. 5 shows a single-layer multi-touch sensing electrode group of a touch panel according to another embodiment of the present invention. A sensing electrode 510, a sensing electrode 520, a sensing electrode 530 and a sensing electrode are transmitting electrodes, and are arranged along the y direction shown in the diagram to become directly connected or connected via connecting lines to a control unit (not shown). A sensing electrode 140, a sensing electrode 150, a sensing electrode 160 and a sensing electrode 170 are receiving electrodes, and are similarly arranged along the y direction and parallel to the arrangement direction of the transmitting electrodes. The transmitting electrodes may be further divided into two types of electrodes, which are denoted as sensing electrodes T0 and sensing electrodes T1, respectively. The sensing electrodes T0 and the sensing electrodes T1 are alternately arranged. FIG. 6A and FIG. 6B show enlarged views of the sensing electrodes of the embodiment in FIG. 5 of the present invention. A sensing electrode 601 shows an enlarged view of the sensing electrode T0 in FIG. 5, and includes a body 610, a connecting portion 620 and an extension portion 630. The connecting portion 620 connects the body 610 and the extension portion 630. An accommodating space 640 is formed between the body 610 and the extension portion 630. In the embodiment, the body 610 and the extension portion 630 are rectangular, and have parallel long sides. Thus, given that a distance between centers of two adjacent sensing electrodes T0 is d3, the length of the extension portion 630 is greater than ½ of d3 and smaller than d3. On the other hand, a sensing electrode 602 shows an enlarged view of the sensing electrode T1 in FIG. 5, and includes a body 650, an extension portion 660 and an extension portion 670. In the embodiment, the body 650 is rectangular, and the extension portion 660 and the extension portion 670 are extended outwards along one of the long sides. In one preferred embodiment, the sensing electrode 602 is horizontally symmetrical. More specifically, regarding an axis passing through the center of the body 350 and parallel to the short sides as an axis of symmetry, the lengths of the extension portion 660 and the extension portion 670 are equal. Thus, given that a distance between the centers of two adjacent sensing electrodes T1 in FIG. 5 is d4, the sum of twice the length of the extension portion 660 (also the extension portion 670) and the length of the body 650 is greater than ½ of d4 and smaller than d4. In one preferred embodiment, respective gaps between the sensing electrodes T0 and the sensing electrodes T1 are equal, i.e., d3 is equal to d4.

The accommodating space 640 of the sensing electrode T0 (i.e., the sensing electrode 601) may be used to accommodate the extension portion of the adjacent sensing electrode T1 (i.e., the sensing electrode 602) of the other type. More specifically, the accommodating space 640 is for accommodating the extension portion 660 or the extension portion 670 of the sensing electrode 602. The extension portion 660 or the extension portion 670 accommodated in the accommodating space 640 is close to the connecting portion 620 of the sensing electrode 601, and a closest distance in between is the technological limit of electrode fabrication. Similarly, gaps between other lines are also restrained by technological limits. It is seen from FIG. 5 that, the sum of twice the length of the extension portion 660 (also the extension portion 670) and the length of the body 650 is smaller than d4. The difference between the two is equal to the sum of the length of the connecting portion 620 of the sensing electrode 601 and twice the gaps in the y direction.

Referring to FIG. 1 and FIG. 5, it is discovered by comparing the sensing electrodes of the present invention with convention sensing electrodes that, the area of the body of the sensing electrode T0 is reduced, and the sensing range of the sensing electrode T0 is increased through the extension portion to allow the sensing electrode T0 to correspond to a larger range of receiving electrodes. More specifically, the sensing electrode 120 in FIG. 1 corresponds to only a lower part of the sensing electrode 150 and an upper part of the sensing electrode 160, whereas the sensing electrode 530 in FIG. 5 corresponds to an entire part of the sensing electrode 150 and the entire part of the sensing electrode 160. Similarly, the area of the body of the sensing electrode T1 is reduced, and the sensing range of the sensing electrode T1 is increased through the extension portion to allow the sensing electrode T1 to correspond to a larger range of receiving electrodes. More specifically, the electrode in FIG. 1 corresponds to only a lower part of the sensing electrode 140 and an upper part of the sensing electrode 150, whereas the sensing electrode 520 in FIG. 5 corresponds to an entire part of the sensing electrode 140 and an entire part of the sensing electrode 150. One advantage of an increase sensing range of transmitting electrodes is the capability of enhancing the linearity of the touch panel.

Figure 7:
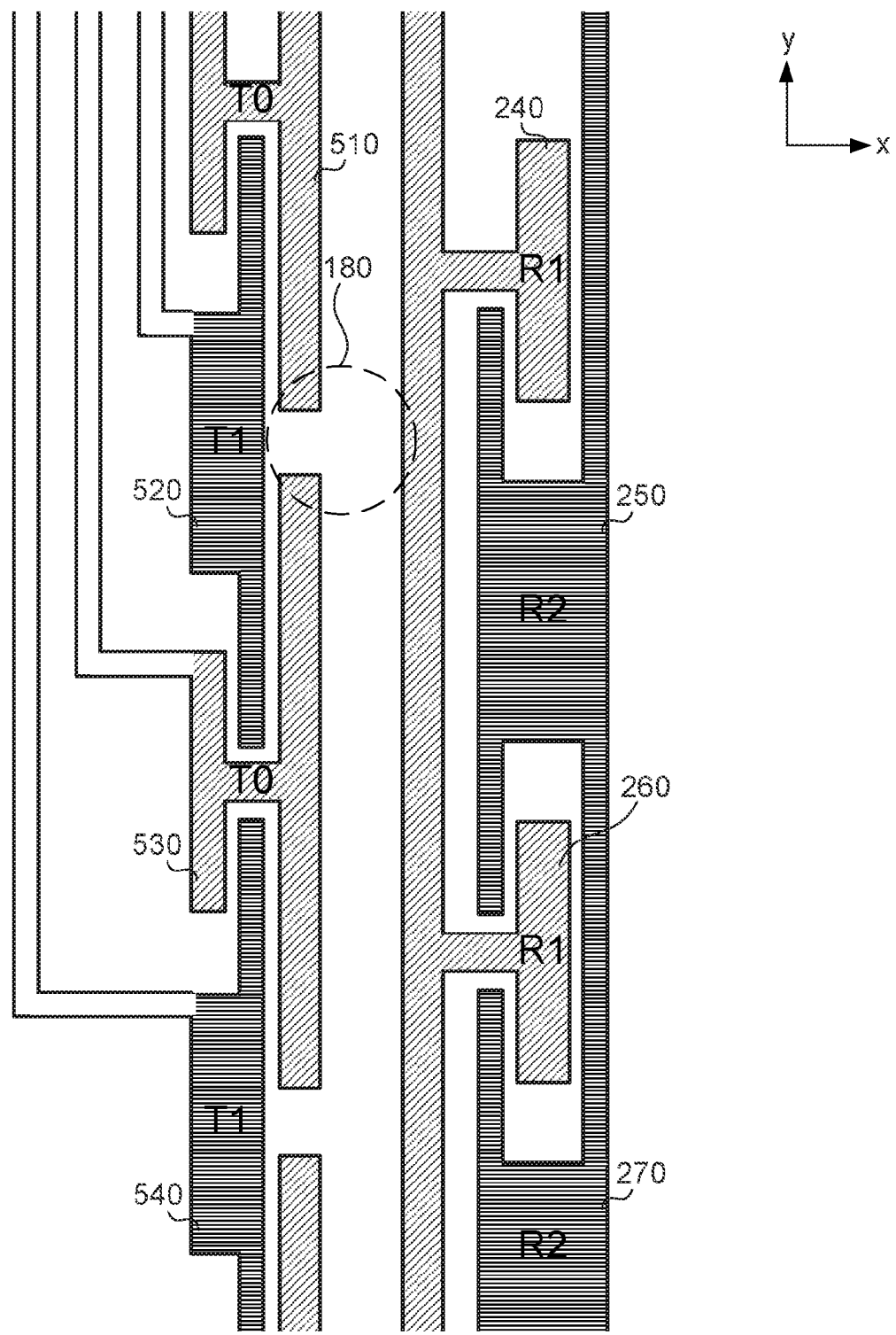
FIG. 7 shows a single-layer multi-touch sensing electrode group of a touch panel according to yet another embodiment of the present invention.
Figure 8:
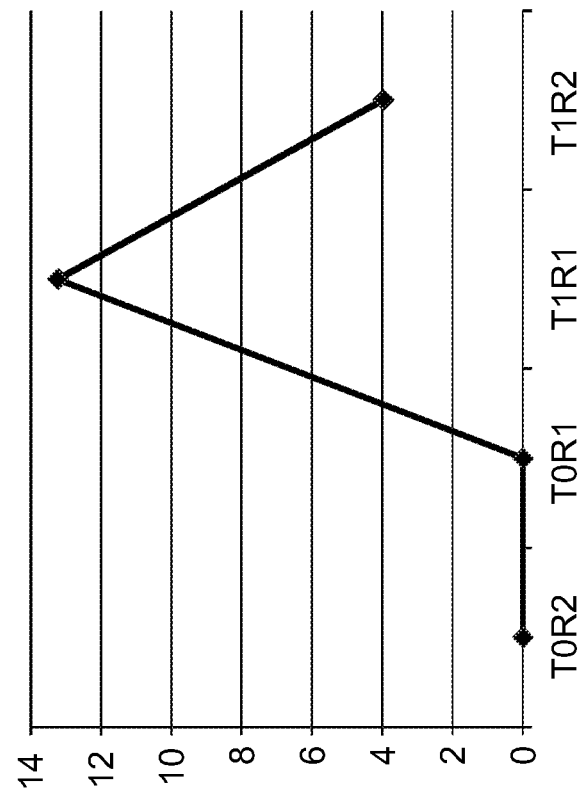
FIG. 8 shows a partial view of the sensing electrode group and a curve diagram of touch sensing values corresponding to the embodiment in FIG. 2 of the present invention.
Figure 8:
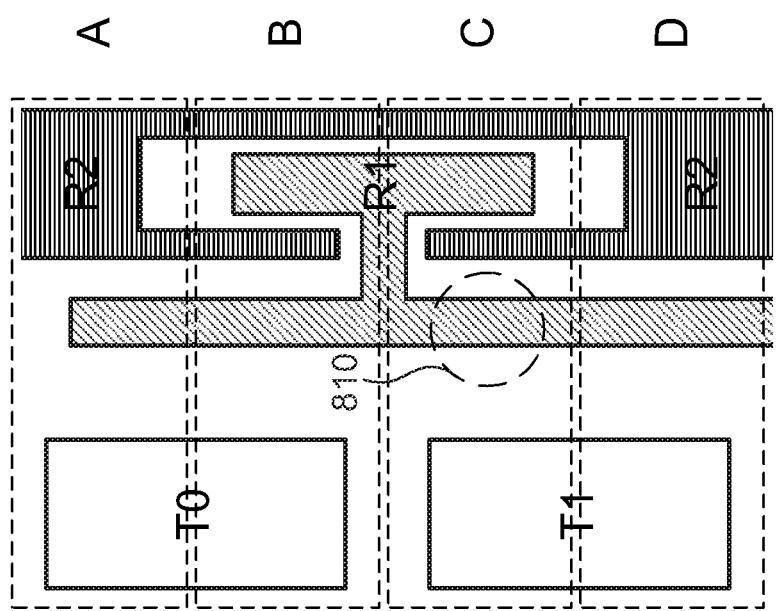
Figure 9:
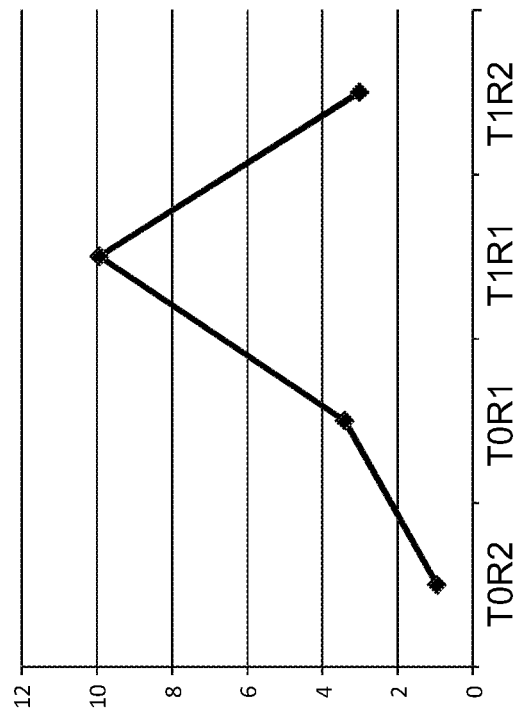
FIG. 9 shows a partial view of the sensing electrode group and a curve diagram of touch sensing values corresponding to the embodiment in FIG. 7 of the present invention.
Figure 9:
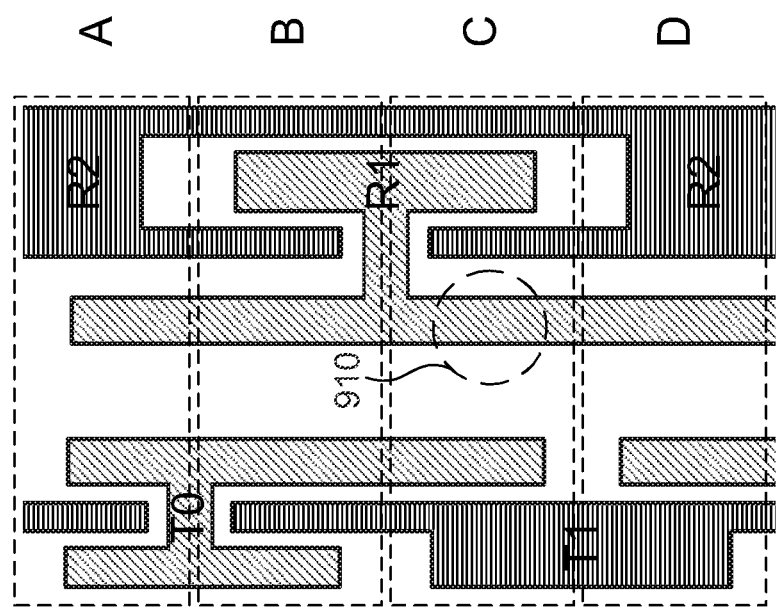

FIG. 7 shows a single-layer multi-touch sensing electrode group according to another embodiment of the present invention. The sensing electrode group of the embodiment is a combination of the embodiments in FIG. 2 and FIG. 5. In the embodiment in FIG. 7, sensing ranges are remarkably increased for both the transmitting electrodes and the receiving electrodes compared to original sensing electrodes. Further, on a same horizontal height, the two types of transmitting electrodes have overlapping sensing ranges. Similarly, the two types of receiving electrodes also have overlapping sensing ranges. Such electrode arrangement helps enhance the linearity of the touch panel. FIG. 8 and FIG. 9 show partial views of the sensing electrode group and curve diagrams of touch sensing values corresponding to the embodiment in FIG. 2 and the embodiment in FIG. 7, respectively. In FIG. 8, the left half shows partial view of the sensing electrode group in FIG. 2, and the right half shows a curve of touch sensing values (in a unit of pf/meter) corresponding to different partial regions. The partial sensing view on the left side are divided into four regions—a region A, a region B, a region C and a region D. When a touch event 810 occurs in the region C, the sensing electrode T1 in the region corresponds to the sensing electrode R1 and the sensing electrodes R2, with the sensing electrode R1 occupying a higher ratio. Thus, the curve at the right side shows that T1R1 between the sensing electrode T1 and the sensing electrode R1 (corresponding to the horizontal axis T1R1) has the largest touch sensing value, T1R2 between the sensing electrode T1 and the sensing electrode R2 has the second largest touch sensing value, and T0R2 between the sensing electrode T0 and the sensing electrode R2 as well as T0R1 between the sensing electrode T0 and the sensing electrode R1 have touch sensing values in 0. FIG. 9 corresponds to the sensing electrodes in FIG. 7. Similarly, when a touch event 910 occurs in the region C, because the area of the sensing electrode R1 is greater than the area of the sensing electrodes R2 in that region, the touch sensing value corresponding to T1R1 has the largest touch sensing value on the right side of the diagram. Further, as the sensing electrode T0 extends to the region C, touch sensing values also exist at regions between the sensing electrode T0 and the sensing electrode R1 as well as between the sensing electrode T0 and the sensing electrode R2. Because the sensing region R1 in the region C has a greater area, the touch sensing value between the sensing electrode T0 and the sensing electrode R1 is larger than the touch sensing value between the sensing electrode T0 and the sensing electrode R2. Comparing FIG. 8 and FIG. 9, it is known that, with a larger extension scope of the transmitting electrodes and hence a broader detectable range, the embodiment in FIG. 7 has better touch linearity compared to the embodiment in FIG. 2.

Figure 10:
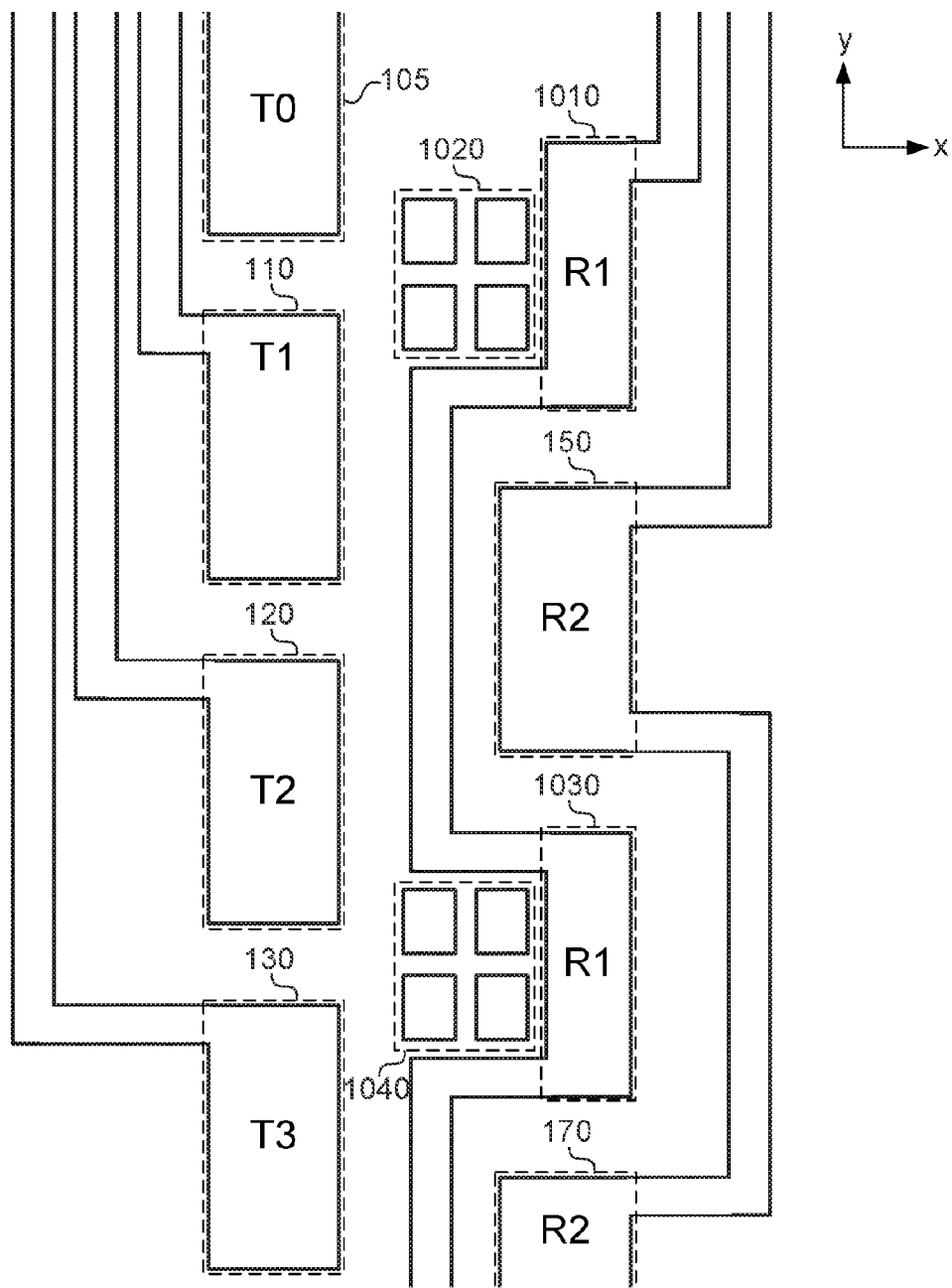
FIG. 10 shows a single-layer multi-touch sensing electrode group of a touch panel according to yet another embodiment of the present invention.

FIG. 10 shows a single-layer multi-touch sensing electrode group according to another embodiment of the present invention. Compared to the conventional sensing electrodes in FIG. 1, receiving electrodes are adjusted in this embodiment. The sensing electrode R1 originally reacts more sensitively to a touch event than the sensing electrode R2 because of the connecting section 115. To balance the sensitivities of the sensing electrode R1 and the sensing electrode R2 for the touch event, in this embodiment, the area of the sensing electrode R1 (i.e., a sensing electrode 1010 and a sensing electrode 1030) is smaller than the area of the sensing electrode R2 (i.e., a sensing electrode 150 and a sensing electrode 170). In one preferred embodiment, the sensing electrode R1 and the sensing electrode R2 are rectangular, and have equal long sides, with however shorter sides of the sensing electrode R1 being shorter than shorter sides of the sensing electrode R2. That is, the sensing electrode R1 is narrower in order to reduce the area of the electrode to cancel the difference between the sensing sensitivities between the sensing electrode R1 and the sensing electrode R2 caused by the connecting line 115. However, as the sensing electrode R1 gets narrower than the sensing electrode R2, a larger blank region is resulted between the sensing electrode R1 and the transmitting electrode. To prevent this region from causing uneven brightness levels of an image on a display screen, a dummy electrode 1010 and a dummy electrode 1040 are filled into this blank region. The dummy electrode 1020 and the dummy electrode 140 are made of a same material as the sensing electrode, and are not applied with any electric potential. It should be noted that, although each of the dummy electrode 1020 and the dummy electrode 1040 includes four unit electrodes that are rectangular in this embodiment, the numbers and shapes of the unit electrodes are not limited to the above examples.

It should be noted that, the transmitting electrodes and receiving electrodes of the foregoing embodiments may be exchanged. For example, the sensing electrode 510, the sensing electrode 520, the sensing electrode 530 and the sensing electrode 540 in FIG. 7 may serve as receiving electrodes, and the sensing electrode 240, the sensing electrode 250, the sensing electrode 260 and the sensing electrode 270 may serve as transmitting electrodes. Such modification may be easily achieved through adjusting signal transmitting and receiving timings of the control unit.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A single-layer multi-touch sensing electrode group of a touch panel, comprising:
    a plurality of first electrodes; and
    a plurality of second electrodes, comprising:
        a plurality of first sub-electrodes, each comprising:
            a first body; and
            a first extension portion,
            wherein a first accommodating space is formed between the first body and the first extension portion; and
        a plurality of second sub-electrodes, each comprising:
            a second body; and
            a plurality of second extension portions,
            wherein at least one second accommodating space is formed between the second extension portions;
        wherein the first sub-electrodes and the second sub-electrodes are alternately arranged, the first sub-electrodes connected to one another, the second sub-electrodes connected to one another, each of the first accommodating spaces accommodates one of the second extension portions, the second accommodating spaces accommodate the first bodies, the first body is smaller than the second body, and a plurality of mutual capacitance changes between the first electrodes and the second electrodes are for calculating a position of a touch event.

2. The sensing electrode of a touch panel according to claim 1, wherein the first electrodes are arranged along a distribution direction, and the second electrodes are arranged parallel to the distribution direction.

3. The sensing electrode of a touch panel according to claim 1, wherein centers of the second bodies of adjacent second sub-electrodes are spaced by a predetermined distance, and a sum of twice a length of the second extension portion that is accommodated in each of the first accommodating spaces and a length of each of the second bodies is smaller than the predetermined distance.

4. The sensing electrode of a touch panel according to claim 1, wherein centers of the second bodies of adjacent second sub-electrodes are spaced by a predetermined distance, and a sum of twice the length of the second extension portion that is not accommodated in each of the first accommodating spaces and the length of each of the second bodies is equal to the predetermined distance.

5. The sensing electrode of a touch panel according to claim 1, wherein the second bodies are rectangular, and the second extension portions are extended outwards along two parallel sides of the second bodies.

6. The sensing electrode of a touch panel according to claim 1, wherein centers of the first bodies of the adjacent first sub-electrodes are spaced by a predetermined distance, and a length of each of the first extension portions is equal to the predetermined distance.

7. The sensing electrode of a touch panel according to claim 1, wherein each of the first sub-electrodes further comprises a connecting portion that connects the first body and the first extension portion, and the first body and the first extension portion are rectangular and have parallel long sides.

8. The sensing electrode of a touch panel according to claim 1, wherein the first bodies and the second bodies are rectangular, and have equal long sides.

9. The sensing electrode of a touch panel according to claim 1, wherein the first electrodes are same-shaped.

10. A single-layer multi-touch sensing electrode group of a touch panel, comprising:
    a plurality of first electrodes; and
    a plurality of second electrodes, comprising:
        a plurality of first sub-electrodes, each comprising:
            a first body; and
            a first extension portion,
            wherein an accommodating space is formed between the first body and the first extension portion; and
        a plurality of second sub-electrodes, each comprising:
            a second body; and
            a plurality of second extension portions,
            wherein the accommodating spaces accommodate the second extension portions;
        wherein the first sub-electrodes and the second sub-electrodes are alternately arranged;
    wherein the first body is smaller than the second body, and a plurality of mutual capacitance changes between the first electrodes and the second electrodes are for calculating a position of a touch event.

11. The single-layer multi-touch sensing electrode group of a touch panel according to claim 10, wherein the first electrodes are arranged along a distribution direction, and the second electrodes are arranged parallel to the distribution direction.

12. The sensing electrode of a touch panel according to claim 10, wherein each of the first sub-electrodes further comprises a connecting portion that connects the first body and the first extension portion, and the first body and the first extension portion are rectangular and have parallel long sides.

13. The sensing electrode of a touch panel according to claim 10, wherein centers of the first bodies of adjacent first sub-electrodes are spaced by a predetermined distance, and a length of each of the first extension portions is greater than ½ of the predetermined distance and smaller than the predetermined distance.

14. The sensing electrode of a touch panel according to claim 10, wherein centers of the second bodies of adjacent second sub-electrodes are spaced by a predetermined distance, and a sum of twice a length of each of the second extension portions and a length of each of the second bodies is smaller than the predetermined distance.

15. The sensing electrode of a touch panel according to claim 10, wherein the second bodies are rectangular, and the second extension portions are extended outwards along one of long sides of the second bodies.

16. The sensing electrode of a touch panel according to claim 10, wherein the first bodies and the second bodies are rectangular, and have equal long sides.

17. The sensing electrode of a touch panel according to claim 10, wherein the first electrodes are same-shaped.

* * * * *